United States Patent Office.

OTTO FISCHER, OF MUNICH, ASSIGNOR TO FARBWERKE, VORMALS MEISTER, LUCIUS & BRÜNING, OF HÖCHST-ON-THE-MAIN, GERMANY.

PREPARATION OF OXYHYDRO-METHYL CHINOLINE.

SPECIFICATION forming part of Letters Patent No. 276,796, dated May 1, 1883.

Application filed February 10, 1883. (No specimens.) Patented in Germany March 21, 1882, No. 21,150; in England June 28, 1882, No. 3,044, and in Russia September 7, 1882, No. 6,456.

*To all whom it may concern:*

Be it known that I, OTTO FISCHER, a citizen of the Empire of Germany, residing at Munich, Germany, have invented certain new and useful Improvements in the Production of Oxyhydro-Methyl Chinoline, of which the following is a specification.

My invention consists in the preparation of oxyhydro-methyl chinoline from chinoline, and in the utilization of this compound for medical purposes.

It is a fact well known that the basic oils from coal-tar contain, besides other bases, chinoline and its homologues, which may be separated by fractionate distillation, treatment with weak oxidizing agents, or by other suitable methods. It is, however, chinoline which is of interest to me, as from this base I have obtained by a series of operations new compounds which I find to be valuable medical agents.

I have described in my patent for oxyhydro-ethyl chinoline, No. 273,498, a method of obtaining oxychinoline, which begins with pure chinoline sulpho-acid and its conversion into oxychinoline and oxysulpho-chinoline and terminating in oxyhydro-ethyl chinoline. In the present application it is my object to obtain oxyhydro-methyl chinoline in which the early steps followed in the process are the same as those of said patent as far as the production of oxyhydro-chinoline is concerned.

In the manufacture of the chinoline methyl salt I proceed as follows: One molecule of alpha oxyhydro-chinoline is heated upon the water bath with one molecule of methyl iodide until the reaction, which is violent at first, has come to a standstill. From the crystalline mass obtained on cooling the hydro-iodide of oxyhydro-methyl chinoline is extracted by means of water, and the new base itself is precipitated from the aqueous solution of the salt by means of caustic soda. It is afterward purified by crystallization from ether.

Instead of methyl iodide methyl chloride or bromide may be used.

For use the base is transformed into the respective salt by means of hydrochloric, sulphuric, or other acids.

Having thus described my invention, what I claim as new, and desire to secure by Letters Patent, is—

1. The process of manufacturing oxyhydro-methyl chinoline, which consists in first converting pure chinoline into oxychinoline by the well-known process, then producing oxyhydro-chinoline by treating oxychinoline with tin and hydrochloric acid, as described in United States Patent No. 273,498, then converting oxyhydro-chinoline into oxyhydro-methyl chinoline by treatment of the isomeric oxyhydro-chinolines with methyl iodide in a manner similar to that described in said patent for oxyhydro-ethyl chinoline, substantially as set forth.

2. Oxyhydro-methyl chinoline prepared by the process herein described.

In testimony whereof I have affixed my signature in presence of two witnesses.

OTTO FISCHER.

Witnesses:
JOS. W. HARPER,
EMIL HENZEL.